Patented Dec. 5, 1944

2,364,538

UNITED STATES PATENT OFFICE 2,364,538

PREPARATION OF β-ALANINE

Philip M. Kirk, Stamford, and Joseph H. Paden, Glenbrook, Conn., assignors to American Cyanamid Company, New York, N. Y., a corporation of Maine No Drawing. Application October 3, 1941, Serial No. 413,570

5 Claims. (Cl. 260—534)

This invention relates to a method for the preparation of amino acids from cyanohydrins and ammonia. More particularly it relates to a method of preparing beta-aminopropionic acid (beta-alanine) from ethylene cyanohydrin and ammonium hydroxide.

In accordance with the present invention we have discovered that amino acids may be produced directly from cyanohydrins by a relatively simple and easily controlled reaction in a single operation. It is an advantage of the present invention that the only reactants essential for the operation of the process are a cyanohydrin and ammonium hydroxide. It is a further advantage of the present invention that the amino acids are produced directly from the cyanohydrin without requiring the isolation of any intermediate product. It is also an advantage of the invention that amino acids are obtained in good yields and in a form which permits them to be easily separated from the reaction mixture.

Beta-aminopropionic acid (beta-alanine) has recently become an important intermediate for use in the preparation of pantothenic acid. The production of beta-alanine is therefore a preferred embodiment of our invention since it results in a method for the production of a very pure form of beta-alanine and more cheaply than by the processes employed heretofore. When the process of our invention is employed for the production of beta-alanine, ethylene cyanohydrin is heated with an ammonium hydroxide solution at a temperature of about 200° C. for a period of time in a pressure vessel. The temperature and the period of time for heating may be varied to a considerable extent. For reasons of economy we usually prefer to use temperatures within the range of from about 180° C. to about 225° C. and a period of time ranging from one to eight hours. The beta-alanine produced by the above reaction may be isolated as such or converted to an acid salt such as the hydrochloride or an alkali metal or alkaline earth metal salt and isolated as the salt.

The invention will be further illustrated in connection with the following specific examples. It should be understood, however, that the examples are for the purpose of illustration only and the invention is not limited to the details set forth therein. The parts are by weight unless otherwise stated.

Example 1

A mixture of 98 parts of ethylene cyanohydrin and 816 parts of 20% ammonium hydroxide was heated at 200° C. for four hours in a pressure vessel. It was then treated with charcoal, cooled, and filtered; the filtrate was evaporated to a syrupy consistency or until the water had been removed and then diluted with 300 parts of methanol; whereupon beta-alanine crystallized and was recovered by filtration. The yield was about 25%.

Example 2

The process described in Example 1 was repeated with two parts of diphenylamine added to the mixture to act as a corrosion inhibitor. Beta-alanine was again obtained in crystalline form and in substantially the same yield.

Example 3

Forty-two pounds ethylene cyanohydrin and 229 pounds 10% ammonium hydroxide were heated at 150–165° C. for 8.5 hours. The solution was filtered and evaporated to a dry syrup. The syrup was diluted with methanol and on filtration yielded 2.1 pounds of beta-alanine (4% yield).

Example 4

356 grams ethylene cyanohydrin and 1930 grams 10% ammonium hydroxide were heated to 250° C. for four hours. The syrup obtained upon concentration when diluted with methanol produced 34 grams of beta-alanine (7.6% yield).

Example 5

A solution of 20.8 pounds of ethylene cyanohydrin and 202 pounds of 20% ammonium hydroxide was heated at 195° C. for four hours in a pressure vessel. It was treated with charcoal, cooled, and filtered. The filtrate was evaporated to a syrupy consistency and diluted with three gallons of methanol; whereupon beta-alanine crystallized and was recovered by filtration. The yield was about 29%.

Example 6

Forty-two pounds of ethylene cyanohydrin and 229 pounds of 10% ammonia were heated four hours at 200° C. in a pressure vessel. It was treated with charcoal, cooled, and filtered. The filtrate was evaporated to a syrupy consistency and diluted with three gallons of methanol; whereupon beta-alanine crystallized and was recovered by filtration, the yield being about 26%.

Example 7

310 parts of ethylene cyanohydrin and 1591 parts of 5% ammonium hydroxide were heated at 197° C. for four hours in a pressure vessel.

It was treated with charcoal, cooled, and filtered. The filtrate was evaporated to a syrupy consistency and diluted with methanol; whereupon beta-alanine crystallized and was recovered by filtration, the yield being about 30%.

*Example 8*

The filtrates from the beta-alanine recovery steps of Examples 1 through 7 were evaporated to reclaim the methyl alcohol. The thick syrupy residues when re-worked gave additional yields of beta-alanine. A representative run on the residue was as follows:

226 parts of the residue were added to 600 parts of 28% ammonia and 1080 parts of water. The mixture was heated at 200° C. for four hours and the beta-alanine recovered as in previous examples. The yield was about the same as a corresponding run on ethylene cyanohydrin, the yield being 24% as compared to 26%.

It appears that an equilibrium is reached in the reaction between the ethylene cyanohydrin and the aqueous ammonia, which may account for the fact that after the beta-alanine is removed, the residue can again be treated with ammonium hydroxide to produce further quantities of beta-alanine. When over-all yields are considered this is extremely important because yields approaching the theoretical may be obtained in re-working the residues.

In addition to the tests described in the specific examples a number of further reactions were carried out wherein the strength of the ammonium hydroxide solution was varied from two to 28% and wherein the proportion of ethylene cyanohydrin based on the proportion of ammonia was also varied. In these further experiments the temperatures employed were varied from 150° to 250° C. and the time of heating was varied from one to twenty-four hours. In all of these experiments beta-alanine was readily obtained. The yields of beta-alanine may be increased to as high as 50-60% by employing low concentrations of ethylene cyanohydrin. The increased cost of removing the larger volumes of solvent in isolating the product, however, may decrease the economical advantages resulting from the increased yields.

As mentioned heretofore in this specification, the beta-alanine produced by our process may, if desired, be converted to the acid salt, such as the hydrochloride or the salt of a metal such as an alkali metal or an alkaline earth metal salt, and isolated in the form of the salts. We prefer, however, to isolate the beta-alanine directly from the concentrated syrupy reaction product by diluting with absolute methanol. Methanol is peculiarly suited for this isolation or crystallization step because we have found that various other aliphatic alcohols, such as ethanol or propanol, do not produce satisfactory results. When the beta-alanine is crystallized from the methanol mixture, it is in a pure form and may then, if desired, be converted to the salts when it is required that the salts of beta-alanine be utilized as intermediates in processes for producing pantothenic acid.

In the reaction between ethylene cyanohydrin and ammonium hydroxide, under the conditions described above, it may be desirable in some instances to add other substances to the reaction mixture. For example, a dehydration catalyst might be added or an ammonium salt of a weak acid, such as for example ammonium carbonate, inhibitors, anti-oxidants, or other suitable reagents for slightly altering the course or speed of the reaction.

The present invention is concerned primarily with the production of beta-alanine involving a reaction between ethylene cyanohydrin and aqueous ammonia and which permits the beta-alanine to be separated therefrom by simply diluting with anhydrous methanol. Similar processes, however, may be carried out in which cyanohydrins other than ethylene cyanohydrin are employed for reacting with ammonia to produce the corresponding amino acids. Similarly, it may be possible to utilize substituted amines (e. g., alkyl, alkylol, aryl) instead of the ammonia for the production of substituted beta-alanine or substituted amino acids.

We claim:

1. The process of producing beta-aminopropionic acid which comprises heating ethylene cyanohydrin with aqueous ammonia at a temperature of from about 180° C. to about 225° C.

2. The process of producing beta-aminopropionic acid which comprises heating at a temperature of about 200° C. a mixture of ethylene cyanohydrin and aqueous ammonia for from about one to twenty-four hours.

3. The process of producing beta-aminopropionic acid which comprises heating ethylene cyanohydrin with aqueous ammonia at a temperature of from 180° C. to 225° C. for a period of from one to twenty-four hours, concentrating the reaction mixture to a syrup and diluting with methanol to cause precipitation of beta-aminopropionic acid.

4. The process of producing beta-aminopropionic acid which comprises heating at a temperature of about 200° C. a mixture of ethylene cyanohydrin and aqueous ammonia for from about one to twenty-four hours, concentrating the reaction mixture to a syrup and diluting with methanol to cause precipitation of beta-aminopropionic acid.

5. The process of producing beta-aminopropionic acid which comprises heating ethylene cyanohydrin with aqueous ammonia at a temperature of from 180° C. to 225° C. for a period of from one to twenty-four hours, concentrating the reaction mixture to a syrup and diluting with methanol to cause precipitation of beta-aminopropionic acid, collecting said beta-aminopropionic acid, concentrating the residue and heating said residue with aqueous ammonia at a temperature of from 180° C. to 225° C. for a period of one to twenty-four hours to produce further quantities of beta-amino-propionic acid.

PHILIP M. KIRK.
JOSEPH H. PADEN.